Figure 1:
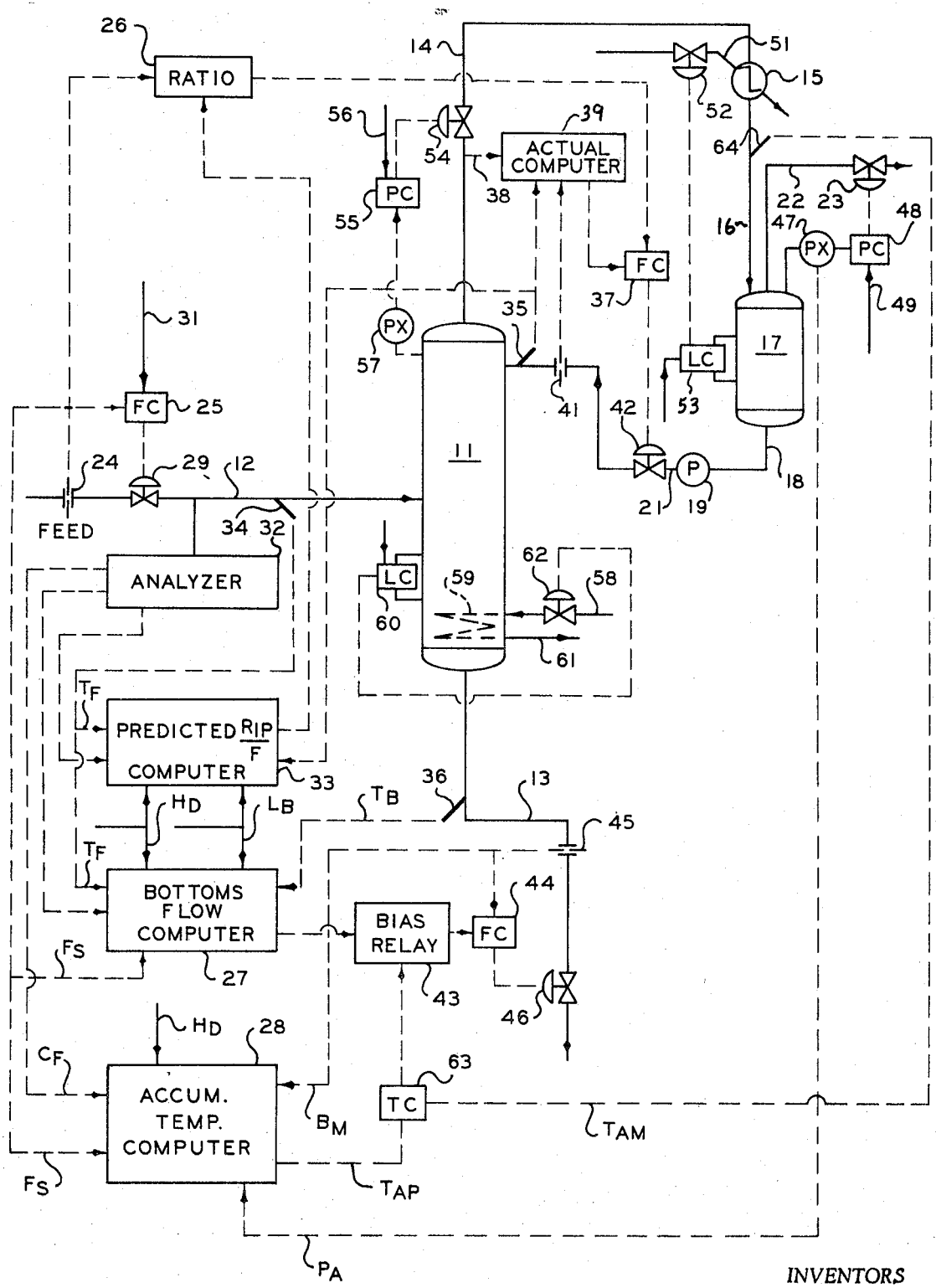

United States Patent

[11] 3,619,377

[72] Inventors Jim B. Palmer
  Bartlesville, Okla.;
  Dale E. Lupfer, Sweeny, Tex.
[21] Appl. No. 847,314
[22] Filed Aug. 4, 1969
[45] Patented Nov. 9, 1971
[73] Assignee Phillips Petroleum Company

[54] CONTROL OF COMPOSITION OF OVERHEAD VAPOROUS PRODUCT IN A PARTIALLY CONDENSING FRACTIONATION COLUMN
10 Claims, 2 Drawing Figs.

[52] U.S. Cl. .................................................. 202/160,
  203/1, 203/2, 203/3, 62/37, 203/DIG. 18,
  235/151.12, 196/141
[51] Int. Cl. .................................................. B01d 3/42
[50] Field of Search .......................................... 203/2, 1, 3;
  202/160; 196/132, 141; 62/21, 37; 203/DIG. 18;
  235/151.12

[56] References Cited
UNITED STATES PATENTS

| | | | |
|---|---|---|---|
| 3,039,941 | 6/1962 | Sweeney .................. | 196/141 |
| 3,294,648 | 12/1966 | Lupfer et al. ............ | 203/2 |
| 3,296,097 | 1/1967 | Lupfer ..................... | 203/2 |
| 3,322,650 | 5/1967 | Hillburn .................. | 203/2 |
| 3,338,825 | 8/1967 | Taggart ................... | 203/DIG. 18 |
| 3,449,215 | 6/1969 | Johnson et al. ......... | 202/160 |

Primary Examiner—Wilbur L. Bascomb, Jr
Attorney—Young and Quigg

ABSTRACT: A multicomponent feed is fractionated in a distillation column to produce an overhead vapor stream, which is then partially condensed and passed to an accumulator to obtain a liquid external reflux stream and an overhead vaporous product stream. The accumulator pressure is maintained substantially constant. A signal representative of the predicted accumulator temperature is established, based on measurements of feed flow rate, feed composition, overhead product specifications, accumulator pressure, and bottoms product flow rate. The predicted accumulator temperature is compared with the measured accumulator temperature to obtain a bias signal. This bias signal is used to manipulate the bottoms product flow rate to effect the adjustment of the accumulator temperature to a value at which the concentration of a key component of the overhead vaporous product is substantially equal to the desired concentration thereof.

INVENTORS
J.B. PALMER
D.E. LUPFER

BY Young & Quigg
ATTORNEYS

CONTROL OF COMPOSITION OF OVERHEAD VAPOROUS PRODUCT IN A PARTIALLY CONDENSING FRACTIONATION COLUMN

This invention relates to apparatus for controlling a fractional distillation column, wherein only a part of the overhead from the column is condensed.

D.E. Lupfer has described in U.S. Pat. 3,296,097, issued Jan. 3, 1967, a system for predictively controlling a fractional distillation column. While this system has proved advantageous in various fractionation systems, it has become desirable to provide an improved control system for a fractional distillation system wherein only a part of the vaporous overhead stream from the column is condensed, the remaining vapor being withdrawn as a vaporous overhead product stream. When no vapor is removed from the accumulator in a totally condensing system, the compositions of the liquid overhead product stream and the liquid external reflux stream are the same as the composition of the vaporous stream withdrawn from the column overhead. However, when only a part of the vaporous overhead stream is condensed, the compositions of the vaporous overhead product and of the liquid external reflux can differ from each other, and therefore will also differ from that of the vaporous overhead stream due to the interacting effects of the overhead stream composition and of the temperature, and pressure following partial condensation. Moreover, the compositions of the overhead vaporous product stream and the liquid external reflux stream vary with variations in accumulator temperature and/or pressure. Nevertheless, it is frequently desirable that the concentration of a key component in the vaporous overhead product be maintained substantially constant at a desired specification.

In accordance with the present invention, it has now been discovered that the desired vaporous overhead product specification can be maintained by maintaining the accumulator pressure substantially constant; establishing a signal representative of the predicted accumulator temperature, based on measurements of feed flow rate, feed composition, overhead product specifications, accumulator pressure, and bottoms product flow rate; comparing the predicted accumulator temperature with the measured accumulator temperature to obtain a bias signal; and utilizing this bias signal to manipulate the bottoms product flow rate to adjust the accumulator temperature to a value at which the concentration of a key component of the overhead vaporous product is substantially equal to the desired concentration thereof.

Accordingly, it is an object of the present invention to provide an improved control system for a partially condensing fractional distillation column. It is an object of the invention to provide means for maintaining a desired component concentration in a vaporous overhead product from a fractional distillation system. Another object of the invention is to provide a more economical control system having a greater degree of reliability.

Other objects, aspects and advantages of the invention will be apparent from a study of the specification, the drawings and the appended claims to the invention.

Figure 2:
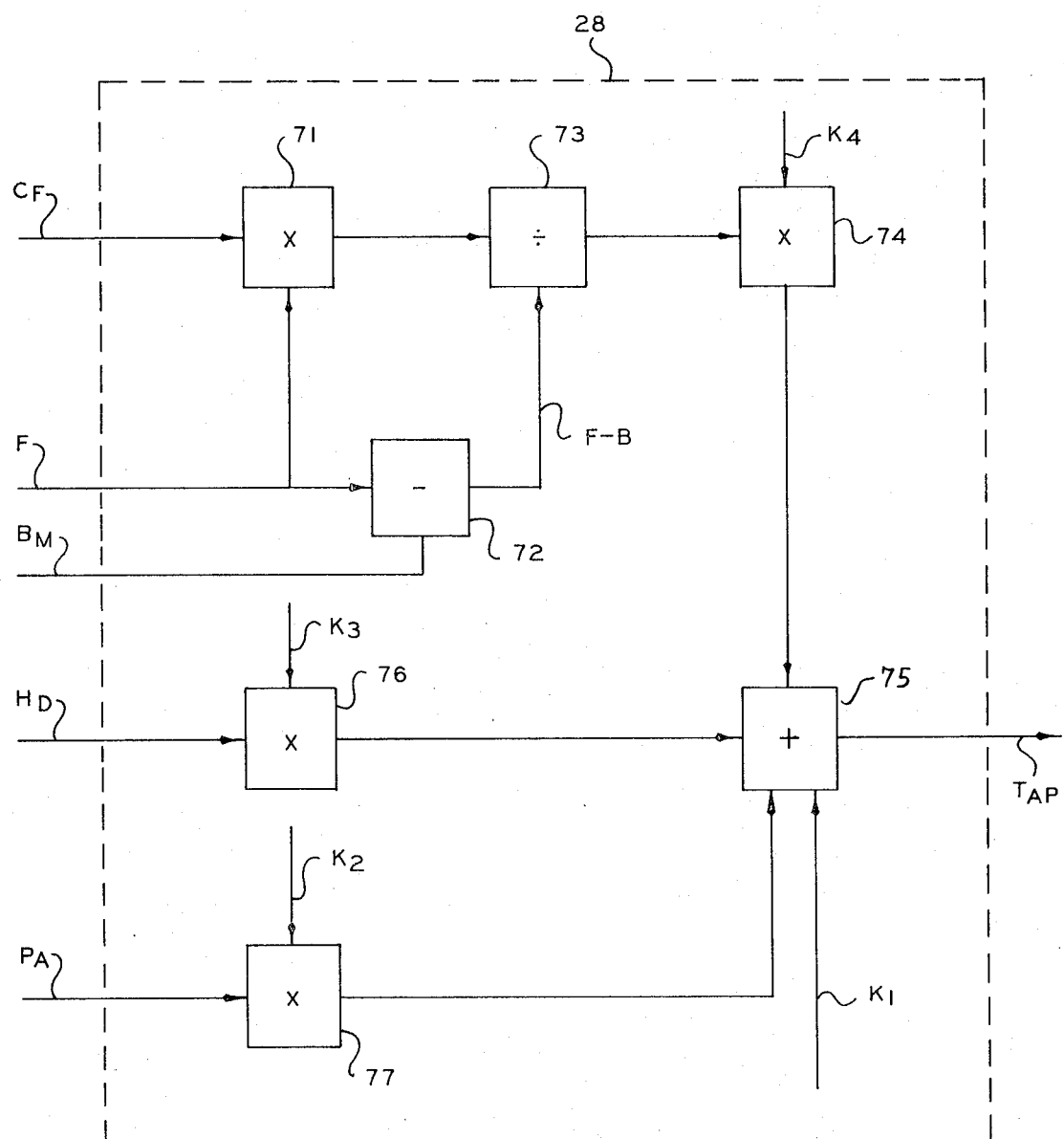

In the drawings FIG. 1 is a diagrammatic representation of a fractional distillation system embodying a control system in accordance with the present invention, and FIG. 2 is a schematic representation of the components of the accumulator temperature computer of FIG. 1.

Referring now to the drawings in detail and FIG. 1 in particular, there is shown a conventional fractional distillation column 11 which can be provided with a plurality of vertically spaced liquid-vapor contact trays. A multicomponent mixture containing a light key component, a heavy key component, at least one lighter-than-light key component, and generally at least one heavier-than-heavy key component, is supplied by way of conduit 12 and introduced onto a feed tray in column 11 located at an intermediate level therein.

It is customary in multicomponent distillation to designate two of the feed components as the light key component and the heavy key component. The light key component and the heavy key component are the two components whose recoveries in the overhead product stream and in the bottoms product stream are specified in advance. The light key and the heavy key components may also be considered as the components between which the split or cut is made. The lighter-than-light key components are more volatile than the light key component which in turn is more volatile than the heavy key component. Similarly, the heavy key component is more volatile than the heavier-than-heavy key component. Since perfect separation between the light key component and the heavy key component is impossible, some of the heavy key component will appear as an impurity in the overhead product and some of the light key component will appear as an impurity in the bottoms product. The operation of a fractional distillation column can be specified by designating the fraction ($H_D$) of the heavy key component desired in the overhead product and the fraction ($L_B$) of the light key component desired in the bottoms product. Thus a major portion of the heavy key component, substantially all of the heavier-than-heavy key component, and a minor portion of light key component are withdrawn as a bottoms product stream from a lower portion of fractional distillation column 11 by way of conduit 13. Similarly, a major portion of the light key component, substantially all of the lighter-than-light key component, and a minor portion of the heavy key component are withdrawn from an upper portion of fractional distillation column 11 as an overhead vaporous stream.

This overhead vaporous stream is passed by way of conduit 14 into and through condenser 15 to at least partially condense the overhead vaporous stream. The resulting at least partially condensed material is passed from condenser 15 through conduit 16 into accumulator 17 wherein a phase separation occurs. At least a portion of the liquid condensate is withdrawn from accumulator 17 and passed by way of conduit 18, pump 19 and conduit 21 into an upper portion of fractional distillation column 11 as external reflux therefor. An overhead vaporous product stream is withdrawn from the vapor space in the upper portion of accumulator 17 by way of conduit 22 at a rate controlled by valve 23.

The rate of flow of feed passing through conduit 12 is measured by flow sensor 24 and a physical signal representative of this measurement is applied to the measurement input of flow controller 25, a first input of ratio relay 26, an input of bottoms flow computer 27, and an input of accumulator temperature computer 28. Flow controller 25 manipulates valve 29, operatively positioned in conduit 12, responsive to a comparison of the output signal of flow sensor 24 and a setpoint 31 representing the desired feed flow rate. Samples of the feed stream are passed to analyzer 32. Physical signals representative of the concentration in the feed stream of components of interest are applied to inputs of computers 27 and 28 and predicted internal reflux to feed ratio computer 33. The temperature of the feed stream in conduit 12 is measured by temperature sensor 34 and a physical signal representative of this measurement is applied to inputs of computers 27 and 33. The temperature of the external reflux stream in conduit 21 is measured by temperature sensor 35 and a physical signal representative thereof is applied to an input of computer 33. Similarly, the temperature of the bottoms product stream in conduit 13 is measured by temperature sensor 36 and a physical signal representative thereof is transmitted to an input of computer 27. A physical signal, $H_D$, representative of the desired concentration of the heavy key component in the vaporous overhead product is applied to inputs of computers 27, 28 and 33; while a physical signal, $L_B$, representative of the desired concentration of the light key component in the bottoms product is applied to inputs of computers 27 and 33.

Computer 33 produces a physical output signal, $R_{IP}/F$, representative of the predicted ratio of internal reflux to feed in accordance with the relationship:

$$R_{IP}/F = f(F_c, E, F_T, F_e, H_D, L_B)$$

where $R_{IP}$ = predicted internal reflux flow rate (volume/unit time)
$F$ = feed flow rate (volume/unit rate)

$E_c$ = generic symbol for components in feed, each expressed as a liquid volume fraction of feed $E$ = average column tray efficiency $F_T$ = feed tray (numbering trays from top of column)

$F_e$ = feed enthalpy (B.t.u./lb.)

$H_D$ = specified liquid volume fraction of heavy key component in distillate product $L_B$ = specified liquid volume fraction of light key component in bottoms product.

The $R_{IP}/F$ signal is applied to a second input of ratio relay 26 to produce a physical output signal representative of the predicted internal reflux. This output signal is transmitted to the setpoint input of flow controller 37.

The temperature of the vaporous overhead stream in conduit 14 is measured by temperature sensor 38 and a physical signal representative thereof is applied to an input of actual internal reflux computer 39. The output signal from temperature sensor 35 is applied to another input of computer 39. The flow rate of external reflux through conduit 21 is measured by flow sensor 41 and a physical signal representative thereof is transmitted to an input of computer 39. Computer 39 establishes a physical output signal $R_{Im}$ representative of the actual internal reflux in accordance with the relationship:

$$R_{Im} = R_{Em}(1 + k\Delta T)$$

where $R_{Im}$ = computed actual internal reflux flow rate (volume/unit time)

$R_{Em}$ = measured external reflux flow rate (volume/unit time)

$K = C_p/\lambda$, where $C_p$ = specific heat of external reflux (or liquid on top tray) (B.t.u./unit volume/° F.)

$\lambda$ = heat of vaporization of liquid on top tray (B.t.u./unit volume)

$\Delta T = T_O - T_R$ where $T_O$ = temperature of overhead vapor (or liquid on top tray) (°F)

$T_R$ = temperature of external reflux (°F.).

This $R_{Im}$ signal is applied to the measurement input of flow controller 37. Controller manipulates valve 42, operatively positioned in conduit 21, responsive to a comparison of the output signals from computer 39 and ratio relay 26.

Computer 27 produces a physical output signal, B, representative of the predicted bottoms product flow rate in accordance with the relationship:

$$B = f(F_c, F, H_D, L_D, T_b, T_F)$$

where $B$ = predicted flow rate of bottoms product, (volume/unit time)

$F_c$ = generic symbol for the sum of the light key component and components lighter than the light key, each expressed as a liquid volume fraction of feed $F$ = feed flow rate (volume/unit time)

$H_D$ = specified liquid volume fraction of heavy key component in overhead product $L_B$ = specified liquid volume fraction of light key component in bottoms product $T_B$ = temperature of bottoms product at point where bottoms product flow is measured, and $T_F$ = temperature of feed at point where feed flow is measured.

The output signal B is applied to one input of bias relay, or algebraic adder, 43, the control output of which is connected to the setpoint input of flow controller 44. The flow rate of bottoms product through conduit 13 is measured by flow sensor 45 and a physical signal representative of the measured flow rate is transmitted to the measurement input of flow controller 44 and to an input of computer 28. Controller 44 manipulates valve 46 responsive to a comparison of the outputs of flow sensor 45 and relay 43.

Pressure sensor 47 measures the pressure in accumulator 17 and establishes a physical signal representative thereof. This physical signal is applied to the measurement input of pressure controller 48 and to an input of computer 28. A physical signal representative of the desired accumulator pressure is established by setpoint 49 to pressure controller 48. Pressure controller 48 establishes at the control output thereof a physical control signal representative of a comparison of the measured accumulator pressure and the desired accumulator pressure. The control signal is applied to valve 23 to manipulate valve 23 as required to maintain the measured accumulator pressure substantially equal to the desired accumulator pressure.

In order to insure the maintenance of a desired liquid level of condensate in accumulator 17, the rate of flow of coolant through conduit 51 to condenser 15 is varied by valve 52 which in turn is manipulated by level controller 53 operatively positioned on accumulator 17. The rate of flow of the overhead vaporous stream through conduit 14 can be controlled by a valve 54 which is manipulated by pressure controller 55 responsive to a comparison of the desired overhead pressure represented by setpoint 56 and the actual overhead pressure measured by pressure sensor 57. Heat can be supplied to the kettle of column 11 by circulation of steam or other heat exchange medium from supply line 58 into and through reboiler coil 59, the heat exchange medium being withdrawn by way of conduit 61. The flow rate of the heat exchange medium in conduit 58 can be controlled by a valve 62, which can be manipulated by reboiler level controller 60.

Computer 28 produces a physical output signal, $T_{AP}$, representative of the predicted accumulator temperature in accordance with the relationship:

$$T_{AP} = K_1 + K_2 P_A + K_3 H_D + \frac{K_4 F C_F}{F - B_M}$$

wherein $T_{AP}$ = the temperature which would exist for the at least partially condensed material at the measured accumulator pressure with a desired composition represented by the desired concentration of the heavy key component and by the presence of substantially all of the at least one lighter-than-light key component contained in the feed stream $P_A$ = measured accumulator pressure $H_D$ = desired concentration of said heavy key component in said vaporous overhead product stream $F$ = flow rate of said feed stream $B_M$ = flow rate of said bottoms product $C_F$ = concentration in said feed stream of said at least one lighter-than-light key component, and $K_1$)
$K_2$) = constants.
$K_3$)
$K_4$)

The signal $T_{AP}$ is applied to the setpoint input of temperature controller 63. The temperature, $T_{AM}$, of the partially condensed material in conduit 16 is measured by temperature sensor 64 and a physical signal representative of the temperature measurement is transmitted to the measurement input of controller 63. The output of controller 63 is representative of a comparison of the predicted accumulator temperature and the measured accumulator temperature and is applied to a second input of bias relay 43 as a bias signal for the output signal B of computer 27. This results in an adjustment to the bottoms product flow rate. The change in bottoms product flow rate then affects the concentration of the heavy key component in the vaporous overhead stream being withdrawn from the upper portion of column 11. The change in the heavy key component concentration results in a corresponding change in the rate at which condensate is produced in condenser 15, thereby affecting the liquid level of condensate in the accumulator. Liquid level controller 53 then adjusts the coolant flow rate to achieve the desired condensation rate and provide the proper accumulator temperature corresponding to the desired concentration of said heavy key component in the accumulator vapor phase along with substantially all of the lighter-than-light key components.

Referring now to FIG. 2, the physical signal $C_F$, representative of the concentration in the feed of the lighter-than-light key components, is applied to one input of multiplier 71. The physical signal F, representative of the feed flow rate through conduit 12, is applied to a second input of multiplier 71 and to the minuend input of subtractor 72. The signal $B_M$ from flow sensor 45 is applied to the subtrahend input of subtractor 72. The output of multiplier 71 is applied to the dividend input of divider 73 while the output of subtractor 73 is transmitted to the divisor input of divider 73. The output of divider 73 is multiplied by a signal representing $K_4$ in multiplier 74 and the product is transmitted to an input of algebraic adder 75. The physical signal representative of $H_D$ is multiplied by a physical signal representing $K_3$ in multiplier 76 and the resulting product is applied to an input of adder 75. The physical signal representative of $P_A$ is multiplied by a physical signal representing $K_2$ in multiplier 77 and the resulting product is applied to an input of adder 75. A physical signal representative of $K_1$ is applied to an input of adder 75. The physical signal at the output of adder 75 is representative of the predicted temperature for accumulator 17 for the measured accumulator pressure and with the desired concentration of heavy key component in the vaporous overhead product.

While the invention has been illustrated in terms of analog computing and control elements, other types of equipment such as digital computers and direct digital control elements can be employed. The physical signals generated by the various elements can be electrical, mechanical or pneumatic signals or a combination thereof. While it is presently preferred that the bottoms flow computer be utilized to establish the predicted bottoms flow rate, other means can be employed, including a manual input signal. The use of the accumulator temperature control system of the invention permits a stable control of the composition of the vaporous overhead product at a nominal incremental cost in view of the low cost of the temperature controller 63 and the components of the accumulator temperature computer 28.

We claim:

1. In a fractionation system having a fractional distillation column, first conduit means for passing a multicomponent feed stream containing a light key component and a heavy key component and at least one lighter-than-light key component into said fractional distillation column, said at least one lighter-than-light key component being more volatile than said light key component which in turn is more volatile than said heavy key component, second conduit means for withdrawing a bottoms product from a lower portion of said fractional distillation column, said bottoms product containing at least a major portion of the heavy key component contained in said feed stream, a condenser, an accumulator, third conduit means for passing an overhead vaporous stream from an upper portion of said fractional distillation column into and through said condenser to at least partially condense said overhead vaporous stream and for passing the resulting at least partially condensed material into said accumulator, said overhead vaporous stream containing at least a major portion of the light key component contained in said feed stream and substantially all of said at least one lighter-than-light key component, fourth conduit means for withdrawing condensate from said accumulator and for passing at least a portion of the thus withdrawn condensate into an upper portion of said fractional distillation column as external reflux therefor, fifth conduit means for withdrawing a vaporous overhead product stream from said accumulator; the improvement comprises means for measuring the pressure in said accumulator and establishing a first physical signal representative thereof, means responsive to said first physical signal for controlling the pressure in said accumulator, means for measuring the flow rate of feed passing through said first conduit means and establishing a second physical signal representative thereof, means for analyzing said feed passing through said first conduit means and establishing a third physical signal representative of the concentration in said feed stream of said at least one lighter-than-light key component, means for measuring the flow rate of said bottoms product through said second conduit means and establishing a fourth physical signal representative thereof, means for establishing a fifth physical signal representative of the desired concentration of said heavy key component in said vaporous overhead product stream, means responsive to said first, second, third, fourth and fifth physical signals for establishing a sixth physical signal representative of the temperature which would exist for said at least partially condensed material at the measured accumulator pressure with a desired composition represented by said desired concentration of said heavy key component and by the presence of substantially all of said at least one lighter-than-light key component contained in said feed stream, means for measuring the actual temperature of said at least partially condensed material and establishing a seventh physical signal representative thereof, means responsive to said sixth and seventh physical signals to establish an eighth physical signal representative of a required flow rate of said bottoms product through said second conduit means, and means responsive to said eighth physical signal for controlling said flow rate of said bottoms product through said second conduit means.

2. Apparatus in accordance with claim 1 wherein said means for controlling the pressure in said accumulator comprises first valve means operatively positioned in said fifth conduit means, a pressure controller having a measurement input and a control output, means for applying said first physical signal to said measurement input, and means connected to said control output for manipulating said first valve means.

3. Apparatus in accordance with claim 1 wherein said means for establishing a sixth physical signal comprises means for establishing said sixth physical signal in accordance with the relationship $$T_{AP} = K_1 + K_2 P_A + K_3 H_D + \frac{K_4 F C_F}{F - B_M}$$

wherein $T_{AP}$ is the temperature which would exist for said at least partially
    condensed material at the measured accumulator pressure with a desired composition represented by said desired concentration of said heavy key component and by the presence of substantially all of said at least one lighter-than-light key component contained in said feed stream, $P_A$ is the measured accumulator pressure,
$H_D$ is the desired concentration of said heavy key component in said vaporous overhead product stream,
F is the flow rate of said feed stream,
$B_M$ is the flow rate of said bottoms product,
$C_F$ is the concentration in said feed stream of said at least one lighter-than-light key component, and
$K_1, K_2, K_3$ and $K_4$ are constants.

4. Apparatus in accordance with claim 1 wherein said means for measuring the actual temperature of said at least partially condensed material comprises a temperature sensor operatively connected to a portion of said third conduit means between said condenser and said accumulator.

5. Apparatus in accordance with claim 1 wherein said means for controlling said flow rate of said bottoms product through said second conduit means comprises a second valve means operatively connected in said second conduit means, and means for manipulating said second valve means responsive to said eighth physical signal.

6. Apparatus in accordance with claim 1 further comprising means for controlling the degree of cooling effected on said overhead vaporous stream in said condenser responsive to the liquid level of condensate in said accumulator.

7. Apparatus in accordance with claim 1 wherein said means to establish an eighth physical signal comprises a temperature controller having a measurement input and a setpoint input and a control output, means for applying said sixth physical signal to said setpoint input of said temperature controller, means for applying said seventh physical signal to said measurement input of said temperature controller, a bias relay having first and second inputs and a control output, means for connecting said control output of said temperature controller to said first input of said bias relay, means for applying to said second input of said bias relay a ninth physical signal representative of a desired flow rate of said bottoms product through said second conduit means, the physical signal at the said control output of said bias relay being said eighth physical signal.

8. Apparatus in accordance with claim 7 further comprising means for measuring the temperature of said feed stream in said first conduit means and establishing a tenth physical signal representative thereof, means for measuring the temperature of said bottoms product in said second conduit means and establishing an eleventh physical signal representative thereof, means for establishing a twelfth physical signal representative of the desired concentration of said light key component in said bottoms product, means responsive to said means for analyzing said feed stream to establish a thirteenth physical signal representative of the concentration in said feed stream of said light key component and said at least one lighter-than-light key component, and means responsive to said second, fifth, tenth, eleventh, twelfth and thirteenth physical signals to generate said ninth physical signal, said ninth physical being representative of a predicted desired flow rate of said bottoms product through said second conduit means.

9. Apparatus in accordance with claim 8 further comprising means for controlling the internal reflux in said fractional distillation column.

10. Apparatus in accordance with claim 9 wherein said means for controlling the pressure in said accumulator comprises first valve means operatively positioned in said fifth conduit means, a pressure controller having a measurement input and a control output, means for applying said first physical signal to said measurement input of said pressure controller, and means connected to said control output of said pressure controller for manipulating said first valve means; wherein said means for establishing a sixth physical signal comprises means for establishing said sixth physical signal in accordance with the relationship $$T_{AP} = K_1 + K_2 P_A + K_3 H_D + \frac{K_4 F C_F}{F - B_M}$$

wherein $T_{AP}$ is the temperature which would exist for said at least
  partially condensed material at the measured accumulator pressure with a desired composition represented by said desired concentration of said heavy key component and by the presence of substantially all of said at least one lighter-than-light key component contained in said feed stream,
$P_A$ is the measured accumulator pressure,
$H_D$ is the desired concentration of said heavy key component in said vaporous overhead product stream,
F is the flow rate of said feed stream,
$B_M$ is the flow rate of said bottoms product,
$C_F$ is the concentration in said feed stream of said at least one lighter-than-light key component, and
$K_1$, $K_2$, $K_3$ and $K_4$ are constants;

wherein said means for measuring the actual temperature of said at least partially condensed material comprises a temperature sensor operatively connected to a portion of said third conduit means between said condenser and said accumulator; wherein said means for controlling said flow rate of said bottoms product through said second conduit means comprises a second valve means operatively connected in said second conduit means and means for manipulating said second valve means responsive to said eighth physical signal; and further comprising means for controlling the degree of cooling effected on said overhead vaporous stream in said condenser responsive to the liquid level of condensate in said accumulator.

* * * * *